United States Patent
Suzuki et al.

(10) Patent No.: US 9,340,000 B2
(45) Date of Patent: May 17, 2016

(54) METHOD AND APPARATUS FOR MANUFACTURING BONDED MEMBER

(71) Applicant: Origin Electric Company Limited, Tokyo (JP)

(72) Inventors: Takayuki Suzuki, Tokyo (JP); Masahiro Nakamura, Tokyo (JP); Tomoyuki Saito, Tokyo (JP); Yusuke Wakisaka, Tokyo (JP)

(73) Assignee: Origin Electric Company Limited, Tokyo (JP)

( * ) Notice: Subject to any disclaimer, the term of this patent is extended or adjusted under 35 U.S.C. 154(b) by 111 days.

(21) Appl. No.: 14/075,680

(22) Filed: Nov. 8, 2013

(65) Prior Publication Data

US 2014/0150951 A1    Jun. 5, 2014

(30) Foreign Application Priority Data

Nov. 13, 2012   (JP) ................. 2012-249053

(51) Int. Cl.
   *C09J 5/00*      (2006.01)
   *B32B 37/12*     (2006.01)
   *B32B 38/18*     (2006.01)
   *B32B 38/00*     (2006.01)

(52) U.S. Cl.
   CPC ............ *B32B 37/1284* (2013.01); *C09J 5/00* (2013.01); *B32B 38/1858* (2013.01); *B32B 2038/0076* (2013.01); *B32B 2457/202* (2013.01); *Y10T 156/10* (2015.01); *Y10T 156/1744* (2015.01)

(58) Field of Classification Search
   CPC ........................................ G02F 2001/133331
   USPC ...................................... 156/275.7
   See application file for complete search history.

(56) References Cited

U.S. PATENT DOCUMENTS

2011/0165817 A1*  7/2011  Watanabe et al. ............... 445/25
2011/0232827 A1*  9/2011  Suzuki et al. ................ 156/73.6

FOREIGN PATENT DOCUMENTS

JP    2010-024321    2/2010
JP    2011-206664    10/2011

* cited by examiner

*Primary Examiner* — Scott W Dodds
(74) *Attorney, Agent, or Firm* — Muramatsu & Associates

(57) ABSTRACT

A method and an apparatus is capable of manufacturing a bonded member faster without a protrusion of the adhesive. An adhesive in an amount which becomes predetermined thickness when two rectangular members are bonded together is applied in advance on bonded surfaces of the two members, the applied adhesives of the two members are brought into contact with each other and one of the two members is made to slide along the bonded surface and the two members are overlapped, a portion of the adhesive which is likely to protrude from an end portion of the two overlapped members is cured before occurrence of a protrusion of the adhesive, and the two overlapped members are pressurized while the protrusion of the adhesive is prevented so as to manufacture a bonded member.

2 Claims, 7 Drawing Sheets

(a)

(b)

METHOD AND APPARATUS FOR MANUFACTURING BONDED MEMBER

This application claims the benefit of foreign filing priority of Japanese Patent Application No. 2012-249053, filed Nov. 13, 2012, the entire contents of which are incorporated herein by reference.

BACKGROUND OF THE INVENTION

1. Field of the Invention

The present invention relates to a method and an apparatus for bonding two members together by an adhesive so as to manufacture a bonded member.

2. Description of the Related Art

A method of bonding two members, for example, a liquid crystal panel and protective glass, together by an adhesive so as to manufacture a bonded member includes a pressurizing type and a sliding type.

The pressurizing type method is a method in which an adhesive is applied on a part of a bonded surface of one member, the bonded surfaces of the two plate-shaped members are faced with each other and the adhesive is brought into contact with the other member, the two plate-shaped members are pressurized, and the adhesive is spread (See Japanese Patent Application Laid-Open Publication No. 2010-024321, for example).

The sliding type method is a method in which a bonded surface of one of the two members is coated with an adhesive in advance (pre-coating), the adhesive is supplied so as to become a predetermined thickness between the both members while the members are made to slide, and the both members are made to slide and bonded or in which an adhesive in an amount so as to become a predetermined thickness when the members are bonded is applied in advance on the both bonded surfaces of the two members, and the both members are made to slide and bonded (See Japanese Patent Application Laid-Open Publication No. 2011-206664, for example).

In the pressurizing type method, the larger the magnitude of frictional resistance of an interface between the member and the adhesive is, the larger the viscosity or wettability of the adhesive is or moreover, the larger the sizes of the two, members are, the slower the adhesive is spread, and thus, manufacture of the bonded member is delayed. On the other hand, in the sliding type method, since the member is pre-coated with the adhesive in advance, delay of spread of the adhesive between the members can be solved, but if the member is warped or wavy, it causes protrusion of the adhesive on an end portion of the bonded member.

Thus, the sliding type method includes processing of preventing the adhesive on the end portion of the bonded member from protruding (adhesion protruding prevention processing) in some cases.

FIGS. 9A to 9E are explanatory diagrams of a method of manufacturing a bonded member in which the adhesive protrusion prevention processing is executed in the prior-art sliding type method.

As illustrated in FIG. 9A, first, bonded surfaces of two members 11a and 11b are coated with adhesives 12a and 12b (pre-coating). One of the two members 11a and 11b pre-coated with the adhesives 12a and 12b is made to slide, and a bonded member is manufactured. If two members 11a and 11b are warped or wavy, the adhesives 12a and 12b are applied also along the warping or waviness. Then, one of the two members 11a and 11b pre-coated with the adhesives 12a and 12b is made to slide. When the member 11b is made to slide on the member 11a in an arrow A1 direction in FIG. 9A, for example, if the two members 11a and 11b are warped or wavy (irregular), as illustrated in FIG. 9B, it was found that a distal end portion 12b1 of the adhesive 12b on the member 11b and a rear end portion 12a1 of the adhesive 12a on the member 11a are hollowed-out by the sliding of the member 11b, a part of the adhesives 12a and 12b of the members 11a and 11b is pushed out to the outside of the members 11a and 11b by the distal end portion 12b1 of the adhesive 12b on the member 11b, and an adhesive 12c protrudes on an end portion of a bonded member 13 after sliding.

Thus, even if the two members 11a and 11b are somewhat irregular, in order that the adhesives 12a and 12b are not pushed out to the outside of the members 11a and 11b by the irregularity, sliding is performed by setting a distance between the two members 11a and 11b slightly wider. As a result, protrusion of the adhesive 12c can be prevented, but since the distance between the two members 11a and 11b is widened, as illustrated in FIG. 9C, the adhesives 12a and 12b run short on end portions of the members 11a and 11b.

Thus, after the sliding is finished, as illustrated in FIG. 9D, the distance between the members set wider in advance is reduced by pressurizing between the members 11a and 11b, and a portion running short of the adhesives 12a and 12b on the end portions of the members 11a and 11b is eliminated. That is, the space between the two members 11a and 11b is pressurized in an arrow A2 direction. As a result, the adhesives 12a and 12b are spread in an arrow A31 (A32) direction, and the portion running short of the adhesives 12a and 12b on the end portions of the members 11a and 11b is eliminated, but if the pressurization in the arrow A2 direction is large, the adhesives 12a and 12b protrude. Thus, pressurization is performed slowly. As a result, as illustrated in FIG. 9E, the bonded member 13 in which the adhesive 12 (12a, 12b) on the end portion of the bonded member 13 does not protrude is obtained.

SUMMARY OF THE INVENTION

However, in order to bond the members in the sliding type method so that the adhesive 12 does not protrude, it is necessary that sliding is performed with a distance between the two members 11a and 11b set wider, the members 11a and 11b are slowly pressurized so as to spread the adhesives 12a and 12b and to eliminate a hollowed out portion in the adhesives 12a and 12b on the members 11a and 11b and also, protrusion should be prevented. As a result, the protrusion prevention processing of the adhesive 12 (12a, 12b) on the end portion of the bonded member 13 takes time, and manufacture of the bonded member 13 is delayed.

Moreover, in order to prevent protrusion of the adhesive 12, the adhesives 12a and 12b may be spread by a capillary phenomenon using the weights of the members 11a and 11b without pressurizing the members 11a and 11b, but in doing so, the manufacturing time would take much longer.

The present invention has an object to provide a method and an apparatus for manufacturing a bonded member without protrusion of the adhesive and moreover, capable of manufacturing a bonded member faster.

A method of manufacturing a bonded member according to an invention in the first aspect is characterized in that an adhesive in an amount which becomes a predetermined thickness when two rectangular members are bonded together is applied in advance on bonded surfaces of the two members, the applied adhesives of the two members are brought into contact with each other and one of the two members is made to slide along the bonded surface and the two members are overlapped, a portion of the adhesive which is likely to protrude from an end portion of the two overlapped members is cured before occurrence of a protrusion of the adhesive, and the two overlapped members are pressurized while the protrusion of the adhesive is prevented so as to manufacture a bonded member.

A method of manufacturing a bonded member according to an invention in the second aspect is characterized in that an adhesive in an amount which becomes a predetermined thickness when two rectangular members are bonded together is applied in advance on bonded surfaces of the two members, a projecting portion is provided in advance on a portion of the adhesive which is likely to protrude from an end portion of the two members when the adhesive is applied, the applied adhesives of the two members are brought into contact with each other and one of the two members is made to slide along the bonded surface and the two members are overlapped, the projecting portion of the adhesive of the two overlapped members is cured before occurrence of a protrusion of the adhesive, and the two overlapped members are pressurized while the protrusion of the adhesive is prevented so as to manufacture a bonded member.

An apparatus of manufacturing a bonded member according to an invention in the third aspect is characterized by including a first gripping tool for gripping one member of two rectangular members, each on which an adhesive in an amount which becomes a predetermined thickness when bonded together is applied in advance on a bonded surface and pre-coating is formed, a second gripping tool for gripping the other member of the two members, a driving device for driving the first gripping tool or the second gripping tool so as to bring the applied adhesives on the two members into contact with each other, sliding one of the two members along the bonded surface, and overlapping the two members, an adhesive curing device for curing a portion of the adhesive which is likely to protrude from an end portion of the two overlapped members before occurrence of a protrusion of the adhesive, and a member pressurizing device for pressurizing the two overlapped members while the protrusion of the adhesive is prevented.

An apparatus for manufacturing a bonded member according to an invention in the fourth aspect is characterized in that, in addition to the invention in the third aspect, when the adhesive is applied on the member, a projecting portion is provided in advance on a portion of the adhesive which is likely to protrude from an end portion of the two members, and the adhesive curing device cures the projecting portion before the adhesive protrudes.

According to the invention in the first and third aspects, since one of the two members on which the adhesive has been applied in advance is made to slide along the bonded surface and the two members are overlapped, the portion of the adhesive which is likely to protrude from an end portion of the two overlapped members is cured before the adhesive protrudes, and the two overlapped members are pressurized and the bonded member is manufactured while the protrusion of the adhesive is prevented, in the adhesive having been spread by pressurization, the cured adhesive acts like a seawall, and the protrusion of the adhesive on the end portion of the bonded member can be prevented. Moreover, since the adhesive is spread by pressurization, the bonded member can be manufactured faster while protrusion of the adhesive on the end portion of the bonded member is prevented.

According to the second and fourth aspects, since the projecting portion is provided in advance on the portion of the adhesive which is likely to protrude from an end portion of the two members, and the projecting portion of the adhesives on the two members is cured before occurrence of a protrusion of the adhesive, in this case, too, the projecting portion of the cured adhesive acts like a seawall, and protrusion of the adhesive on the end portion of the bonded member can be prevented, and the same effects as those in the first and third aspects can be obtained.

DESCRIPTION OF THE EMBODIMENTS

Figure 1:
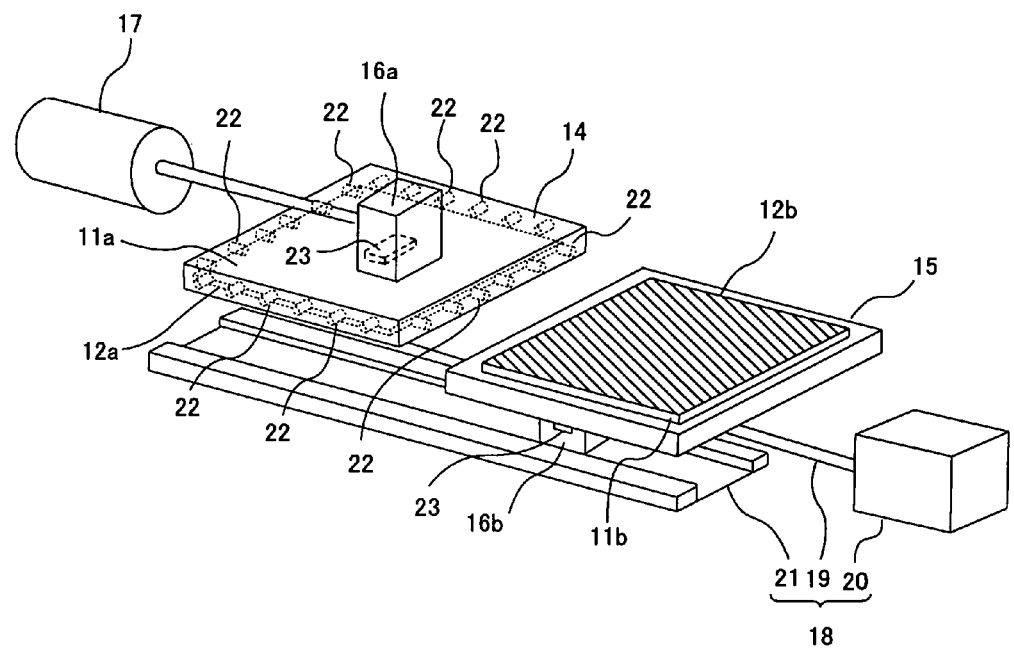
FIGS. 1A and 1B are configuration diagrams each illustrating an example of an apparatus for manufacturing a bonded member which realizes a method for manufacturing a bonded member according to an embodiment of the present invention.
Figure 1:
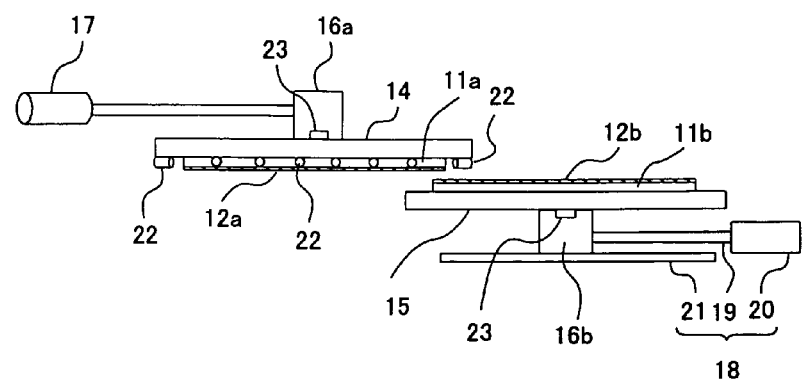

An embodiment of the present invention will be described below. FIGS. 1A and 1B are configuration diagrams each illustrating an example of an apparatus for manufacturing a bonded member which realizes a method for manufacturing a bonded member according to the embodiment of the present invention, in which FIG. 1A is a perspective view and FIG. 1B is a side view. The apparatus for manufacturing a bonded member has a first gripping tool 14 for gripping one member 11a of two members to be bonded together and a second gripping tool 15 for gripping the other member 11b. The members 11a and 11b are formed each having a rectangular shape. The members 11a and 11b are coated (pre-coated) in advance on bonded surfaces with adhesives 12a and 12b in an amount which becomes a predetermined thickness when bonded together. The adhesives 12a and 12b are made of a liquid substance in which a polymer solid portion such as a synthetic adhesive is dissolved in a solvent, and such a substance that, when being irradiated with an ultraviolet ray UV, increases its viscosity in accordance with intensity of the ultraviolet ray and loses fluidity is used, for example.

The first gripping tool 14 and the second gripping tool 15 grip back surfaces of the members 11a and 11b by vacuum adsorption. For example, a plurality of ventilation holes is formed on adsorption surfaces of the first gripping tool 14 and the second gripping tool 15, the ventilation holes communicating with a vacuum pump, and the back surfaces of the members 11a and 11b are adsorbed by an operation of the vacuum pump.

In peripheral portions of each side of the adsorption surface of the first gripping tool 14, a plurality of adhesive curing devices 22 for curing end portions of the adhesives 12a and 12b of the two overlapped members 11a and 11b is provided. As described above, the adhesives 12a and 12b are made of a liquid substance in which a polymer solid portion such as a synthetic adhesive is dissolved in a solvent, so that, when being irradiated with an ultraviolet ray UV, increases its viscosity in accordance with intensity of the ultraviolet ray and loses fluidity and thus, an ultraviolet ray irradiating device is used as the adhesive curing device 22.

Subsequently, a support body 16a is provided on the back surface of the first gripping tool 14, and by rotating the first gripping tool 14 through the support body 16a using a reversing device 17, the gripped surface of the member 11a can be made an upper surface or a lower surface. FIGS. 1A and 1B illustrate a case in which the gripped surface of the member 11a is located on the lower surface.

A support body 16b is provided on the back surface of the second gripping tool 15, and the second gripping tool 15 is driven by a driving device 18, and the member 11b is moved. The driving device 18 includes a movable shaft 19, a driving source 20, and a guide rail 21.

The movable shaft 19 is a rod-shaped member mediating between the support body 16b and the driving source 20 of the second gripping tool 15 and is provided so as to extend horizontally. The movable shaft 19 has one end connected to the support body 16b orthogonal to the adsorption surface of the second gripping tool 15 and the other end connected to the driving source 20.

The driving source 20 is a device for reciprocating the movable shaft 19 in its axial direction (horizontally). The guide rail 21 is a member for limiting a moving direction of the second gripping tool 15 and is linearly laid so as to reciprocate the second gripping tool 15 on a specific straight line. The driving device 18 has a position control function which can adjust a distance for which the movable shaft 19 is moved, and pulse control using a servo or a stepping motor is typically used.

The driving device 18 drives the second gripping tool 15 so as to bring the adhesives 12a and 12b applied on the two members 11a and 11b into contact with each other, slide one of the two members 11a and 11b along the bonded surface, and overlap the two members 11a and 11b. While the driving device 18 is illustrated as moving the second gripping tool 15, a driving device moving the first gripping tool 14 may also be used.

Moreover, a member pressuring device 23 for pressurizing the two overlapped members 11a and 11b is provided between the first gripping tool 14 and the support body 16a and between the second gripping tool 15 and the support body 16b. The member pressurizing device 23 is to pressurize the two overlapped members 11a and 11b so that the bonded thickness becomes a predetermined thickness.

By pressurization of this member pressurizing device 23, the adhesives 12a and 12b are spread. In the spread adhesives 12a and 12b, the adhesives 12a and 12b cured by the adhesive curing device 22 act like seawalls and prevent protrusion of the adhesive 12 on end portions of the two members 11a and 11b.

Figure 2:
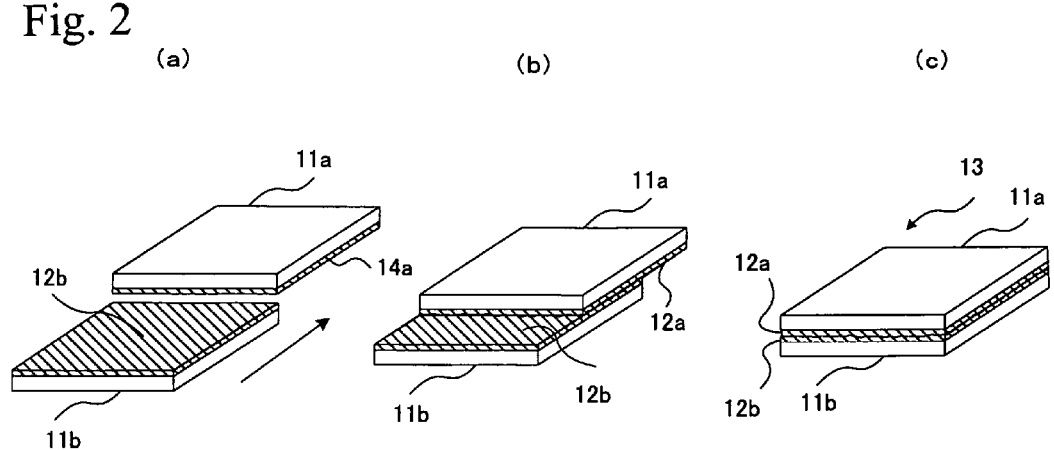
FIGS. 2A to 2C are operation explanatory diagrams until two members are overlapped in the method for manufacturing a bonded member according to the embodiment of the present invention.

Subsequently, a manufacturing process of the bonded member of the present invention will be described. In the description below, a case in which the adhesives 12a and 12b are applied on the whole surfaces of the two members 11a and 11b will be described. FIGS. 2A to 2C are operation explanatory diagrams until the two members are overlapped in the method for manufacturing a bonded member according to the embodiment of the present invention. FIG. 2A illustrates a state in which the surfaces, on which the adhesives 12a and 12b are applied, of the two members 11a and 11b keep a predetermined distance between them, and a side of a rectangular shape is arranged at linearly opposite positions.

From this state, the applied adhesives 12a and 12b of the two members 11a and 11b are brought into contact with each other on one side of the rectangular shape, and as illustrated in FIG. 2B, one of the two members 11a and 11b, that is, the member 11b, for example, is made to slide along the bonded surface in an arrow direction. For example, it is made to slide in vacuum. This is for preventing air bubbles from being included in the bonded surface when the members 11a and 11b are bonded by sliding. If it is not in vacuum, the member is made to slide by giving consideration so that the air bubbles are not included in the bonded surface. In this case, sliding is made while the distance between the two members 11a and 11b is set wider so as to prevent protrusion of the adhesives 12a and 12b. Then, as illustrated in FIG. 2C, the two members 11a and 11b are overlapped to form the bonded member 13.

Figure 3:
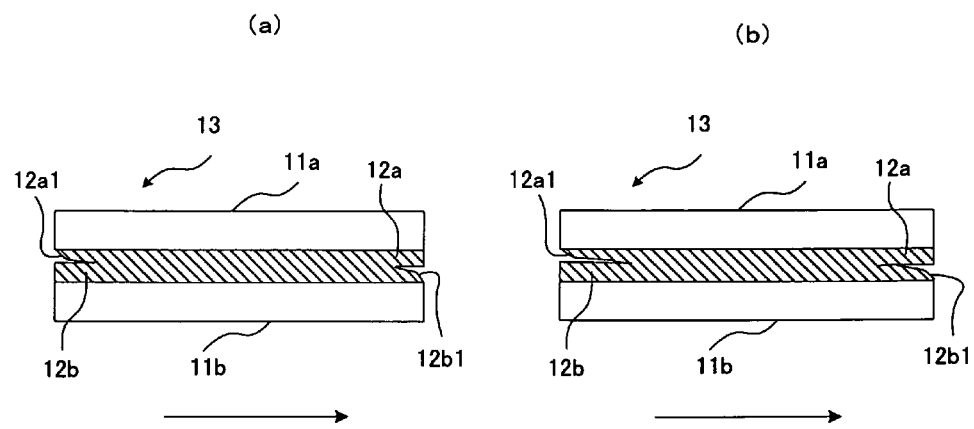
FIGS. 3A and 3B are explanatory diagrams of an overlapped state of the two members of a bonded member 13 formed by the method for manufacturing a bonded member according to the embodiment of the present invention.

FIGS. 3A and 3B are sectional diagrams of a state in which the one member 11b of the bonded member is made to slide and the two members 11a and 11b of the bonded member are overlapped.

In FIGS. 3A and 3B, when the member 11b is made to slide in the arrow direction, the distal end portion 12b1 of the adhesive 12b of the member 11b and the rear end portion 12a1 of the adhesive 12a of the member 11a are hollowed out. In this case, in order that the adhesives 12a and 12b are not pushed out to the outside of the end portion of the bonded member 13, sliding is performed while the distance between the two members 11a and 11b is set wider, and thus, the adhesives 12a and 12b do not protrude. However, the distal end portions 12a1 and 12b1 of the adhesives 12a and 12b are in the hollowed-out state on the end portions of the members 11a and 11b.

Thus, in order to eliminate the hollowed-out portions of the adhesives 12a and 12b, the members 11a and 11b are pressurized. If the adhesives 12a and 12b are applied on the whole surfaces of the members 11a and 11b, it is likely that the adhesive 12 protrudes from an end portion of each side of the members 11a and 11b by pressurization of the members 11a and 11b. Thus, the portion of the adhesive which is likely to protrude from the two overlapped members 11a and 11b is cured before the adhesives 12a and 12b protrude, and using the cured adhesives 12a and 12b as seawalls, protrusion of the adhesives 12a and 12b is prevented. The curing of the adhesives 12a and 12b is performed by irradiating the adhesives 12a and 12b with the ultraviolet ray UV from the adhesive curing device 22.

As described above, when the members 11a and 11b are pressurized and the adhesives 12a and 12b are spread to the end portions, the end portions of the adhesives 12a and 12b are cured by irradiation of the ultraviolet ray UV, but timing of irradiation of the ultraviolet ray UV is set such that the irradiation is made at least before the adhesives 12a and 12b protrude from the end portions of the members 11a and 11b.

When the members 11a and 11b are pressurized, since it is likely that the adhesives 12a and 12b protrude from any one of the four sides of the members 11a and 11b, the timing when irradiation of the ultraviolet ray UV should be performed is slightly different among the sides. That is, on the side in which the hollowed-out portions of the adhesives 12a and 12b are large, it is only necessary that the ultraviolet ray UV irradiation is performed until there is no hollowed-out portion, but on the side in which the hollowed-out portions of the adhesives 12a and 12b are small, it is desirable that irradiation of the ultraviolet ray UV is performed when pressurization is started.

Combinations of pressurization of the members 11a and 11b and irradiation of the ultraviolet ray UV shall be the following three types. That is, (1) irradiation of the ultraviolet ray UV is started before pressurization; (2) irradiation of the ultraviolet ray UV is performed simultaneously with pressurization; and (3) the ultraviolet ray UV irradiation is performed after pressurization. In any case, the adhesives 12a and 12b are cured before protrusion.

FIGS. 4A to 4E are process charts of an example of the adhesive protrusion prevention processing if irradiation of the ultraviolet ray UV is started before pressurization. In the case of a side in which the hollowed-out portion of the adhesive 12b is small as illustrated in FIG. 4A, irradiation of the ultraviolet ray UV is started before pressurization as illustrated in FIG. 4B so that a part of the adhesives 12a and 12b of the members 11a and 11b is cured as illustrated in FIG. 4C. A cured adhesive cured portion 24 becomes a seawall for preventing protrusion of the adhesives 12a and 12b. Then, the members 11a and 11b are pressurized while irradiation of the ultraviolet ray UV is performed. As a result, as illustrated in FIG. 4E, the adhesives 12a and 12b are spread without a gap to an end portion while protrusion of the adhesives 12a and 12b is prevented.

Figure 5:
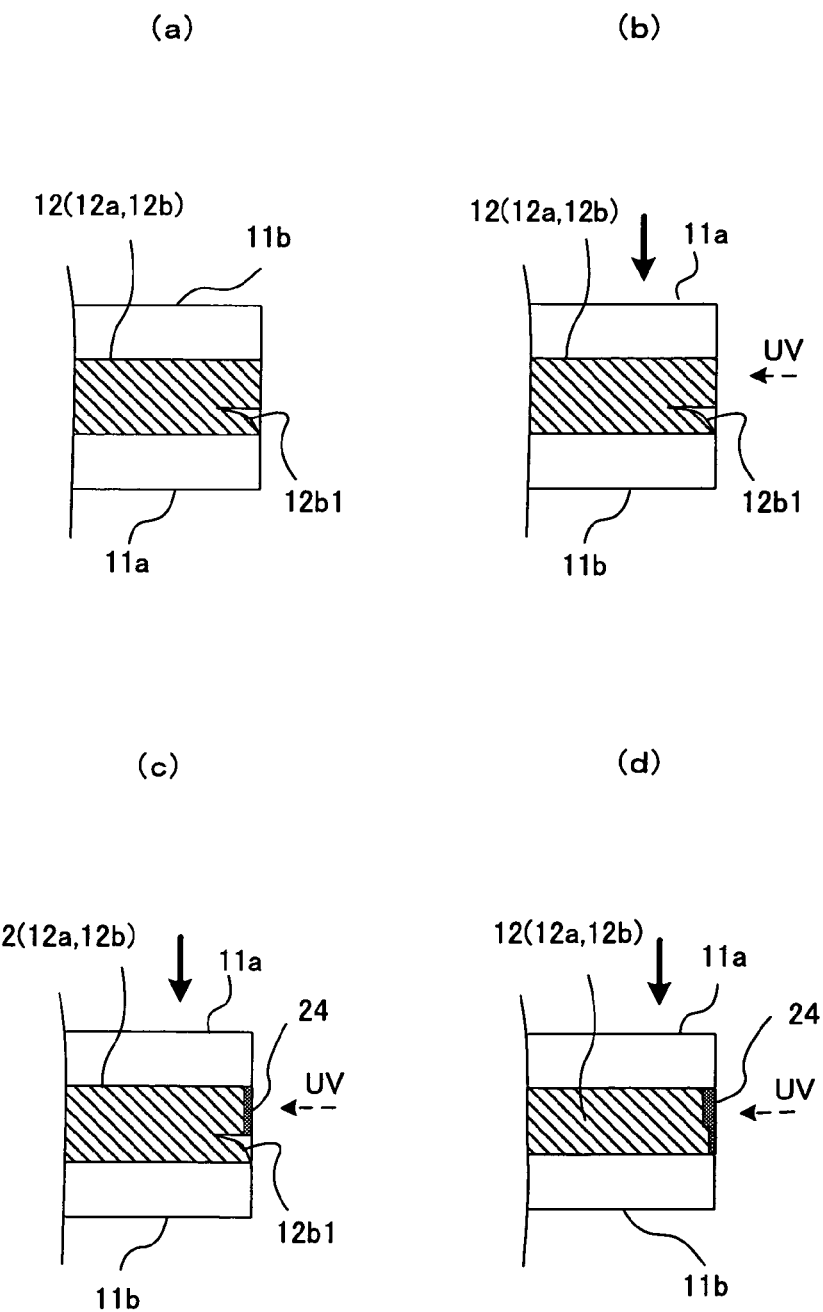
FIGS. 5A to 5D are process charts of another example of adhesive protrusion prevention processing of the two members executed in the state in FIGS. 3A and 3B and after.

FIGS. 5A to 5D are process charts of an example of the adhesive protrusion prevention processing if irradiation of the ultraviolet ray UV is performed simultaneously with pressurization. FIGS. 5A to 5D illustrate a case in which the hollowed-out portion of the adhesive 12b is medium in a state in which the two members 11a and 11b are overlapped. As illustrated in FIG. 5A, to the side in which the hollowed-out portion of the adhesive 12b is medium, irradiation of the ultraviolet ray UV is performed simultaneously with pressurization as illustrated in FIG. 5B, and a part of the adhesives 12a and 12b of the members 11a and 11b is cured as illustrated in FIG. 5C. Then, the members 11a and 11b are further pressurized while irradiation of the ultraviolet ray UV is performed, and as illustrated in FIG. 5D, the adhesives 12a and 12b are spread without a gap to the end portion while protrusion of the adhesives 12a and 12b is prevented.

Figure 4:
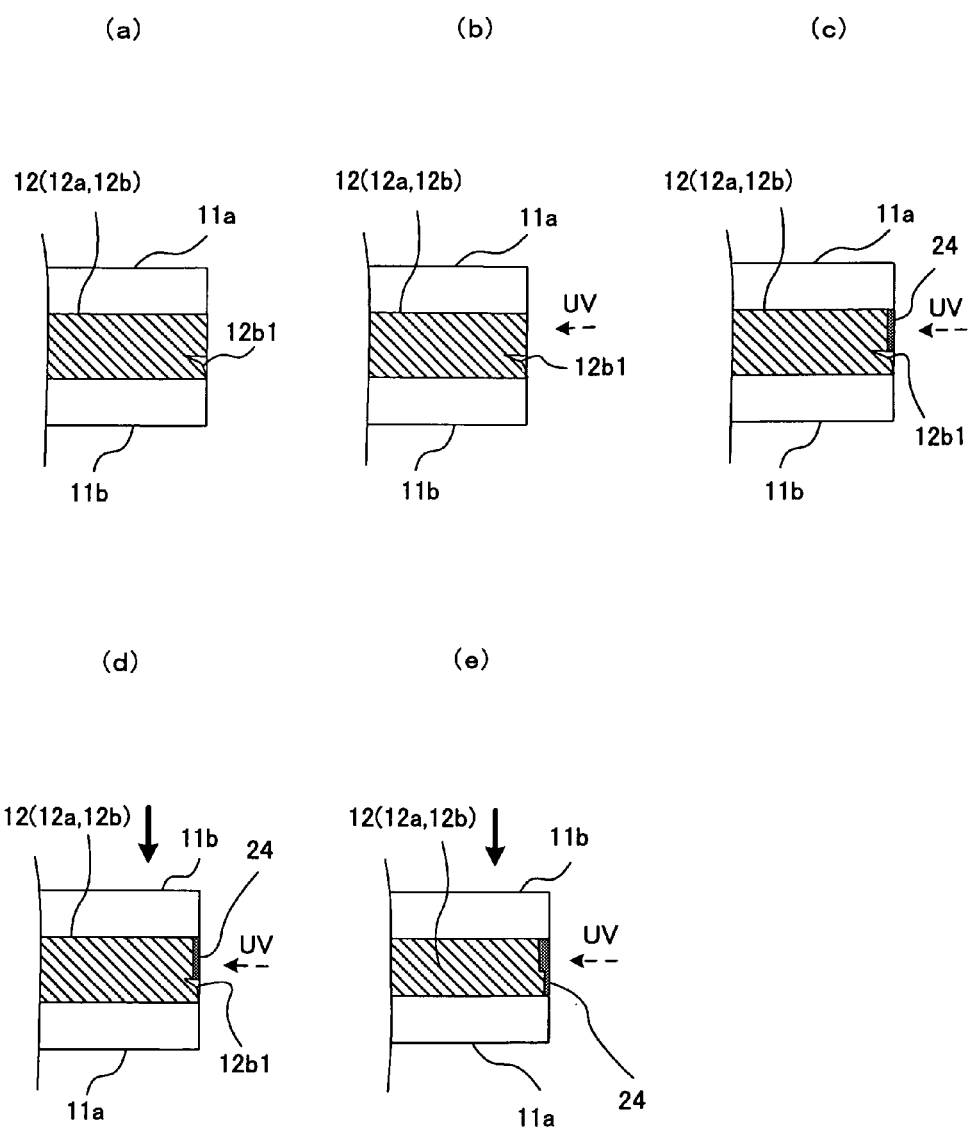
FIGS. 4A to 4E are process charts of an example of adhesive protrusion prevention processing of the two members executed in the state in FIGS. 3A and 3B and after.

Here, since irradiation of the ultraviolet ray UV is performed simultaneously with pressurization, the cured adhesive cured portion 24 has not been formed at the start of pressurization, but since the cured adhesive cured portion 24 is gradually formed, protrusion of the adhesives 12a and 12b at the start of pressurization can be prevented by setting a pressurizing force at the start of pressurization smaller than that in FIG. 4 or by increasing the intensity of the ultraviolet ray UV.

Figure 6:
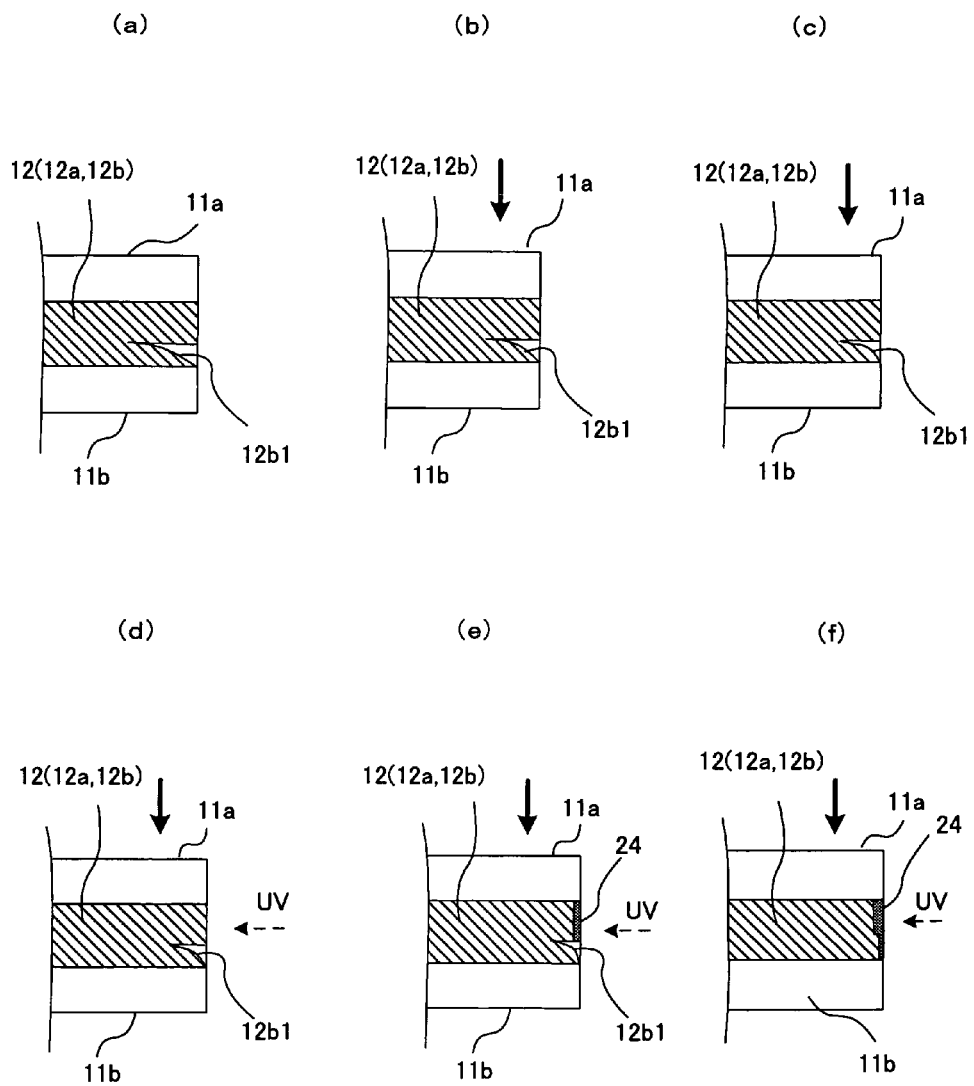
FIGS. 6A to 6F are process charts of still another example of adhesive protrusion prevention processing of the two members executed in the state in FIGS. 3A and 3B and after.

FIGS. 6A to 6F are process charts of an example of the adhesive protrusion prevention processing when irradiation of the ultraviolet ray UV is performed after pressurization. FIGS. 6A to 6F illustrate a case in which the hollowed-out portion of the adhesive 12b is large in a state in which the two members 11a and 11b are overlapped. As illustrated in FIG. 6A, regarding the side in which the adhesive 12b1 has not been spread to the end portion, the members 11a and 11b are pressurized as illustrated in FIG. 6B, and the adhesives 12a and 12b are spread. If the hollowed-out portion of the adhesive 12b becomes smaller as illustrated in FIG. 6C, the ultraviolet ray UV is irradiated to the adhesives 12a and 12b as illustrated in FIG. 6D, and a part of the adhesives 12a and 12b of the members 11a and 11b is cured so as to form the adhesive cured portion 24 as illustrated in FIG. 6E. Then, the members 11a and 11b are further pressurized while irradiation of the ultraviolet ray UV is performed, and as illustrated in FIG. 6F, the adhesives 12a and 12b are spread without a gap to the end portion while protrusion of the adhesives 12a and 12b is prevented.

As described above, the cured adhesive cured portion 24 becomes a seawall, and protrusion of the adhesive 12 on the end portion of the bonded member 13 is prevented. Moreover, since the adhesive 12 is spread by pressurization, the bonded member 13 can be manufactured faster while protrusion of the adhesive on the end portion of the bonded member 13 is prevented.

Figure 7:
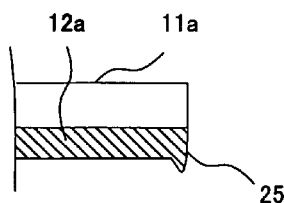
FIG. 7 is a partially cutout sectional view illustrating another example of pre-coating of the adhesive in the method for manufacturing a bonded member according to the embodiment of the present invention.

FIG. 7 is a partially cutout sectional view illustrating another example of pre-coating of the adhesives 12a and 12b in the method for manufacturing a bonded member according to the embodiment of the present invention. In this example, a projecting portion 25 is provided on the end portions of the adhesives 12a and 12b of the members 11a and 11b as compared with the example in FIGS. 2A to 6F.

As illustrated in FIG. 7, the projecting portion 25 is formed on the adhesive 12a which pre-coats the member 11a. In FIG. 7, the example in which the projecting portion 25 is provided on the adhesive 12a of the member 11a is illustrated, but the projecting portion 25 may be provided on the end portion of the adhesive 12b of the member 11b.

FIGS. 8A to 8E are process charts of an example of the adhesive protrusion prevention processing of the member 11a pre-coated with the adhesive 12a having the projecting portion 25 illustrated in FIG. 7. In FIGS. 8A to 8E, the example in which the adhesive 12b1 is spread to the end portion and in the state in which the two members 11a and 11b are overlapped is illustrated.

Figure 8:
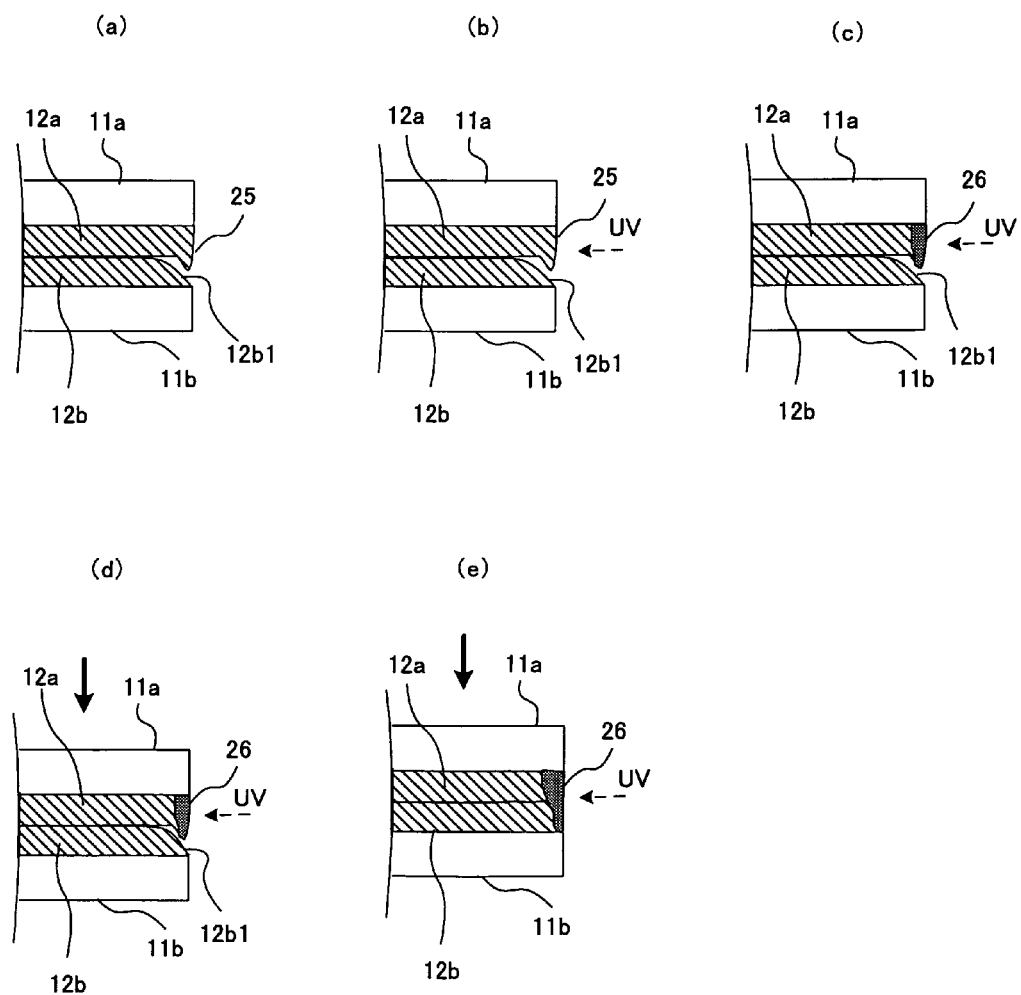
FIGS. 8A to 8E are process charts of an example of the adhesive protrusion prevention processing of the member pre-coated with the adhesive and having a projecting portion illustrated in FIG. 7.
Figure 9:
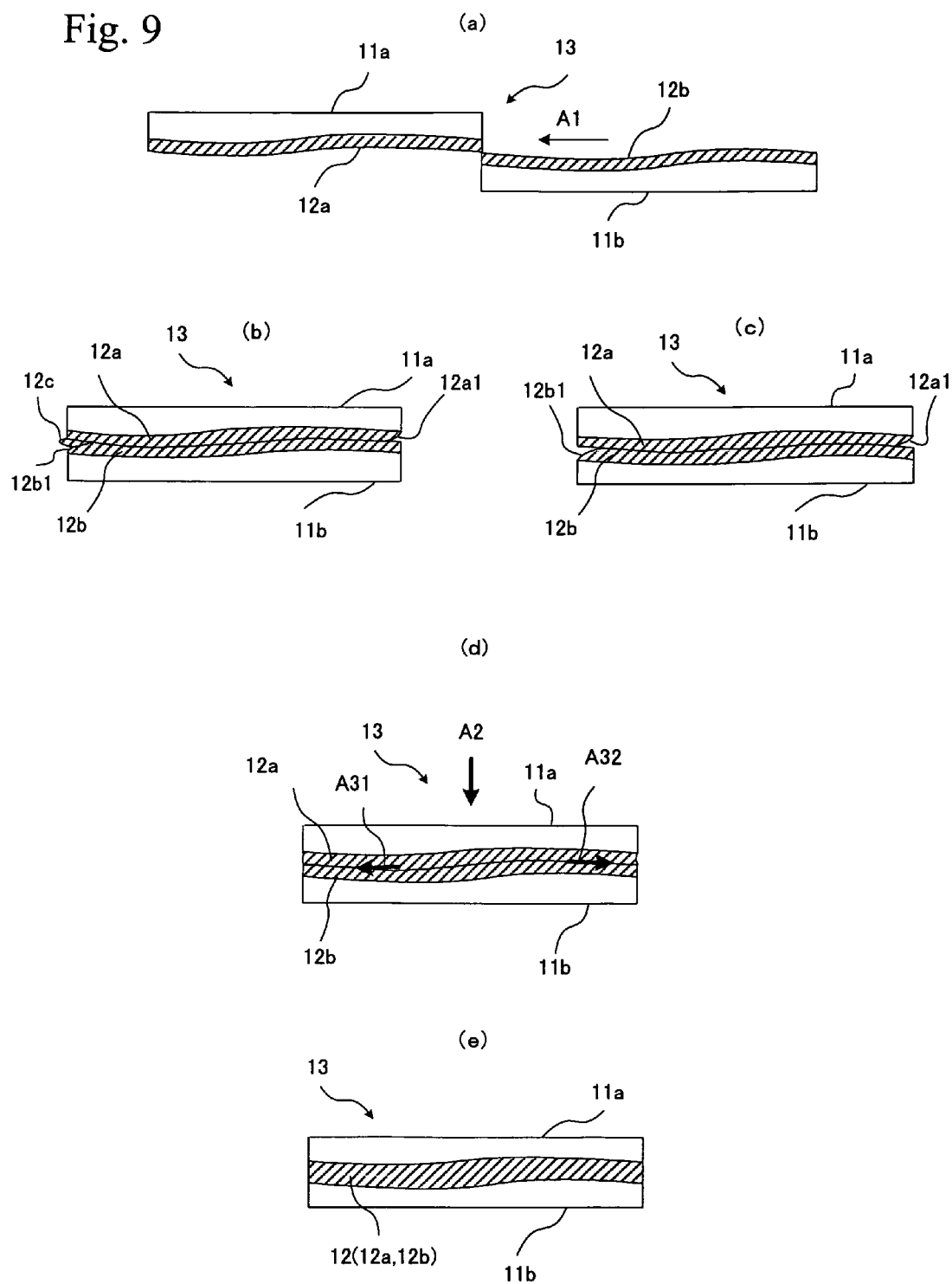
FIGS. 9A to 9E are explanatory diagrams of the method for manufacturing a bonded member in which the adhesive protrusion prevention processing is executed in a prior-art sliding type method.

As illustrated in FIG. 8A, to the side in which the hollowed-out portion of the adhesive 12b is small, as illustrated in FIG. 8B, the ultraviolet ray UV is irradiated to the projecting portion 25 before pressurization and the projecting portion 25 is cured so as to form a projecting portion cured portion 26 as illustrated in FIG. 8C.

Then, as illustrated in FIG. 8D, the two overlapped members 11a and 11b are pressurized while irradiation of the ultraviolet ray is performed from the adhesive curing device 22. By means of this pressurization, the adhesive 12 is spread, but the projecting portion cured portion 26 becomes a seawall in this spread adhesive 12, and protrusion of the adhesive 12 on the end portion of the bonded member 13 is prevented. Moreover, the members 11a and 11b are pressurized while irradiation of the ultraviolet ray UV is performed, and the adhesives 12a and 12b are spread without a gap to the end portion while protrusion of the adhesives 12a and 12b is prevented, as illustrated in FIG. 8E. As described above, since the adhesive 12 is spread by pressurization, the bonded member 13 can be manufactured faster while protrusion of the adhesive on the end portion of the bonded member 13 is prevented.

In the description above, the projecting portion 25 is cured so as to form the projecting portion cured portion 26, and then, pressurization is performed, but before irradiation of the ultraviolet ray is performed from the adhesive curing device 22, the space between two members 11a and 11b may be pressurized within a range that the adhesives 12a and 12b do not protrude.

In the embodiment of the present invention, when the two members 11a and 11b are pressurized and pushed in, a predetermined portion of the adhesive 12 is cured by the ultraviolet rays. Therefore, even if the two members 11a and 11b are pressurized so as to spread the adhesive 12, the cured portions 24 and 26 become the seawalls and the adhesive can be spread to the end portions of the members 11a and 11b without protrusion of the adhesive 12.

The embodiment of the present invention is presented as an example and is not intended to limit the scope of the invention. These new embodiments can be put into practice in various other forms and are capable of various types of omission, replacements, and changes within a range not departing from the gist of the invention. These embodiments and their variations are included in the scope and the gist of the invention and are included in the invention described in appended claims and their equivalent scopes.

What is claimed is:

1. A method for manufacturing a bonded member comprising steps of:

applying an adhesive in advance in an amount which becomes a predetermined thickness when two rectangular members are bonded together on bonded surfaces of the two members;

bringing the adhesives applied on the two members into contact with each other, sliding one of the two members along the bonded surface, and overlapping the two members;

curing only a portion of the adhesive of the two overlapped members, the portion of the adhesive being on an end portion of the two overlapped members; and then pressurizing the two overlapped members to spread the adhesive between the two overlapped members to the end portion while preventing protrusion of the adhesive so as to manufacture the bonded member.

2. A method for manufacturing a bonded member comprising steps of:

applying an adhesive in advance in an amount which becomes a predetermined thickness when two rectangular members are bonded together on bonded surfaces of the two members;

providing a projecting portion in the adhesive when the adhesive is applied, the projecting portion of the adhesive being on an end portion of the two bonded members;

bringing the adhesives applied on the two members into contact with each other, sliding one of the two members along the bonded surface, and overlapping the two members;

curing only the projecting portion of the adhesive on the two overlapped members; and then pressurizing the two overlapped members to spread the adhesive between the two overlapped members to the end portion while preventing protrusion of the adhesive so as to manufacture the bonded member.

* * * * *